United States Patent Office 3,799,739
Patented Mar. 26, 1974

---

3,799,739
METHOD OF ANALYZING FOR CHOLESTEROL
Charles D. Warburton, Rochester, N.Y., assignor to
Eastman Kodak Company, Rochester, N.Y.
No Drawing. Filed May 22, 1972, Ser. No. 255,476
Int. Cl. G01n 33/16
U.S. Cl. 23—230 B            14 Claims

ABSTRACT OF THE DISCLOSURE

Quantitative determination of total cholesterol in body fluids such as blood serum is accomplished by contacting a sample of the fluid with bromine to form brominated derivatives of the cholesterol and cholesterol esters in the fluid, converting the brominated derivatives to the corresponding iodinated derivatives, and measuring the amount of iodine which is liberated upon decomposition of the iodinated derivatives.

---

This invention relates in general to methods of quantitative analysis and in particular to a method of analyzing for cholesterol. More specifically, this invention relates to a method for the quantitative determination of total cholesterol in body fluids, such as blood serum.

Determination of the cholesterol content of blood and other body fluids is a very common procedure in clinical laboratories. A variety of test procedures are known for use in cholesterol determination. These most commonly involve the colorimetric determination of cholesterol following addition to a sample of the body fluid of a reagent adapted to react with the cholesterol to form a colored reaction product. The reagents typically used for this purpose are a mixture of acetic anhydride and sulfuric acid or a mixture of ferric chloride and sulfuric acid. The concentration of cholesterol is determined by using a colorimeter to measure the intensity of the color produced and converting this measurement to a concentration value by use of conversion charts or comparison to standard solutions. While these methods give satisfactory analytical results, they suffer from certain disadvantages which limit their utility. Thus, the procedures involved in sample preparation and handling are complex and time consuming. Moreover, the strongly acidic reagents required in these tests limit their utility to reactions carried out in solution and make them inappropriate for adaptation in analytical systems of the type which a color-forming reaction is carried out within a layer of a test strip intended to be dipped into or spotted with the fluid to be analyzed or within a layer of an analytical tape intended for use in a continuous automated analysis system.

It has now been discovered that quantitative determination of total cholesterol in a body fluid can be accomplished by use of a simple reaction sequence which results in the liberation of iodine in an amount quantitatively related to the content of cholesterol in the fluid. In this method, a sample of the body fluid is treated with bromine to brominate the cholesterol, excess bromine is removed, and the sample is then contacted with a solution of an iodide salt. As a result of reaction with the iodide salt, the brominated cholesterol is converted to the corresponding iodinated derivative and this derivative decomposes to liberate iodine. Both the cholesterol and cholesterol esters in the sample of body fluid undergo the bromination and iodination reactions and, accordingly, the method determines the content of total cholesterol in the sample, that is, the content of cholesterol plus cholesterol esters. In the bromination step, bromine is employed in excess of that which react with the sample to ensure that all of the cholesterol and chloesterol esters are brominated and any unreacted bromine remaining in the sample is then removed. Treatment with the iodide salt displaces the bromine atoms from the brominated derivatives and results in the formation of the corresponding iodinated derivatives which decompose quantitatively to liberate iodine. Measurement of the amount of iodine liberated is an accurate measure of the content of total cholesterol in the sample of body fluid. Any of the many known methods for measurement of iodine which are suitable can be utilized in carrying out the analytical method of this invention.

The bromination reaction which is the first step in the method of this invention results in addition of bromine to the double bond in the 5–6 position of the cholesterol molecule so that cholesterol and its esters are converted to their 5,6-dibromo derivatives. The bromine atoms are readily displaced by contact with an iodide salt, such as sodium iodide, so that the 5,6-dibromo derivatives are converted to the corresponding 5,6-diiodo derivatives. These diiodo derivatives rapidly undergo quantitative decomposition to liberate iodine and regenerate the cholesterol and cholesterol esters. The reactions involved can be illustrated by the following equations in which only the portion of the cholesterol molecule involved in the reaction is shown:

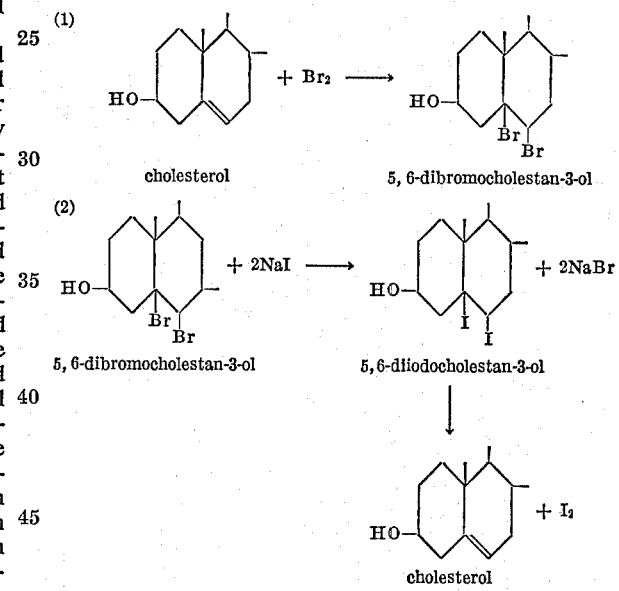

The reactions involved in the method of this invention can be carried out in solution. For example, a body fluid such as serum can be analyzed for total cholesterol by adding bromine water thereto in an amount in excess of that which reacts therewith, removing the unreacted bromine from the solution by reacting it with a phenolic material such as sulfosaliylic acid, and then adding a solution of an iodide salt such as a solution of sodium iodide in acetone. Liberation of iodine by decompositon of the 5,6-diiodo derivatives of cholesterol and its esters that are formed results in the formation of a yellow color in the solution and the intensity of the color developed is proportional to the concentration of totol cholesterol in the serum. Alternatively, the method can be carried out with the aid of a coated test medium.. For example, a sample of the body fluid to be analyzed can be spotted on a polyvinyl alcohol layer coated on an inert support, the spot can be fumed with bromine vapor, and then contacted with a solution of an iodide salt. The iodine liberated will react with the polyvinyl alcohol to form a brown color and, after waiting for a sufficient period of time to ensure that the color-forming reaction is complete, the reflection density of the color formed can be measured to determine the amount of iodine released and thereby the total cholesterol content of the sample. A starch layer can be used in place of the polyvinyl alcohol layer and a blue color will be formed by reaction of the iodine with the starch.

Since the method of this invention provides for quantitative determination of total cholesterol, the sample of body fluid must be contacted with bromine in an amount in excess of that which reacts therewith to ensure that all of the cholesterol and cholesterol esters are brominated. Double bonds in the fatty acid chains of cholesteryl esters, triglycerides, and free fatty acids present in the body fluid are also brominated. However, this does not interfere with the quanitative determination of total cholesterol since the corresponding iodinated derivatives are either not formed or do not decompose to liberate iodine. Accordingly, the fact that both these double bonds and the cholesterol 5-6 double bond are brominated in no way interferes with the quanitative measurement as long as bromine is provided in excess of that which reacts with the sample. It is this unexpected selectivity with respect to the cholesterol 5-6 double bond that makes the reaction sequence described herein useful as a means of quantitatively analyzing for total cholesterol in a body fluid.

The manner in which bromine is brought into contact with the sample of body fluid is not important as long as the bromine is provided in excess. As indicated hereinabove, bromine water can be used if the reactions are carried out in a liquid medium or bromine vapor can be employed if the reaction is carried out on a coated test medium, such as a test strip or tape. An alternative procedure is to incorporate in the test medium a compound, such as silver bromide, which will release bromine upon exposure to activating radiation and then carry out the reaction sequence by spotting the fluid to be analyzed on the test medium, irradiating to effect bromination, and treating with the solution of iodide salt to effect iodination. Regardless of the procedure used in brominating the sample, any excess bromine which remains in the sample must be removed prior to carrying out the reaction with the iodide salt so that the iodine liberated comes entirely from decomposition of the diiodo derivatives of cholesterol and its esters. This liberation of iodine will be in an amount equal to the amount of bromine reacted with the cholesterol and cholesterol esters.

Contact of the brominated fluid with the solution of iodide salt can be carried out in any convenient manner. For example, a solvent solution of the iodide salt can be mixed with the solution containing the brominated cholesterol when the reactions are carried out in solution. When the body fluid has been spotted on a coated test medium and brominated by fuming with bromine vapor, then a small qauntity of a solution of the iodide salt can be spread over the spot to which the sample has been applied. Alkali metal iodides such as sodium iodide or potassium iodide are preferably employed to carry out the iodination and such salts are suitably employed as a solution in acetone or a mixture of acetone and water. The iodide salt must, of course, because in an amount sufficient to totally displace the bromine atoms from the dibromo derivatives of cholesterol and its esters.

Chromatographic elements which are utilized in thin-layer chromatography can be advantageously employed as the test medium in carrying out the method of this invention. These elements are precoated sheet materials consisting of a flexible film support, such as a polyester film, carrying a coating which comprises a chromatographically-active sorbent such as silica gel, dispersed in a polymeric binder, such as polyvinyl alcohol. In utilizing these materials, the cholestero-containing fluid is spotted on the coated layer and the spot is fumed with bromine vapor and then streaked with a solution of an iodide salt. When the binder in the chromatographic element is polyvinyl alcohol, the liberation of the iodine will result in a color-forming reaction with the binder so it is merely necessary to wait for a short period of time, such as a period of ten to fifteen minutes, until reaction with the iodine is complete and then measure the reflection density of the color formed. When the chromatographic element or other test medium employed does not contain a material which reacts with iodine, measurement of the iodine liberated can be easily accomplished by other means such as by incorporating in the solution of the iodide salt a reagent, such as 4,4′-bis-(dimethylamino)thiobenzophenone (also known as thio Michler's ketone), which undergoes a color-forming reaction with iodine.

In an alternative procedure for carrying out the method of this invention, a test medium, such as a thin-layer chromatographic element, can be impregnated with an iodide salt, such as sodium iodide, and a reagent which undergoes a color-forming reaction with iodine, such as 4,4′-bis(dimethylamino)thiobenzophenone. The body fluid which is to be analyzed can be spotted on a material such as filter paper which is then fumed with bromine, brought into contact with the test medium containing the iodide salt to form a sandwich structure, and then treated with a solvent. The method of this invention is also readily adapted to continuous processing techniques such as are described in British Pat. 1,049,364 published Nov. 23, 1966. Thus, for example, a test tape, such as an elongated strip of thin-layer chromatographic sheet material having a polyvinyl alcohol binder, can be unwound from a supply roll, directed through a series of processing zones in which the sequence of reactions is carried out, and then wound on a take-up roll. Processing would involve application of a drop of the serum or other fluid to be analyzed to the surface of the tape, fuming with bromine vapor, application of a jet of air to remove any excess bromine, contact of the spot to which the fluid was applied with a solution of an iodide salt applied to the tape by means of a wick, and passage of the tape through as suitable densitometer to measure the intensity of the color produced by the reaction of the iodine liberated.

The reactions involved in the method of this invention can be carried out at atmospheric pressure and at room temperature with satisfactory results. However, the application of heat will accelerate the liberation of iodine so that it is advantageous in some instances to heat the test medium to a moderately elevated temperature, such as a temperature of about 50 to 60° C.

The invention is further illustrated by the following examples of its practice.

EXAMPLE 1

Five test solutions were prepared by dissolving cholesterol in chloroform at concentrations of 1, 2, 3, 4 and 5 grams per liter respectively. A 10 microliter sample of each of these solutions was spotted on Eastman Chromagram Sheet Type 6061 (trademark for a precoated sheet material used in thin-layer chromatography in which the sorbent is silica gel and the binder is polyvinyl alcohol). The sheet was then fumed with bromines vapors to brominate the cholesterol and then streaked with a solution of sodium iodide in acetone to convert the brominated derivative to the iodinated derivative. Formation of a brown color at the spot where the cholesterol solution had been applied occurred as a result of reaction of the liberated iodine with the polyvinyl alcohol. Liberation of iodine was complete in 15 minutes at room temperature and in less than one minute when the sheet was heated to a temperature of about 60° C. Reflection densities were determined with a reflection densitometer for each of the five tests and the values obtained were 0.045, 0.070, 0.105, 0.150 and 0.185 respectively.

The same procedure was carried out with a solution of cholesteryl myristate and a solution of oleic acid. Formation of a brown color occurred with the spot obtained with cholesteryl myristate, indicating that cholesterol esters undergo the same sequence of reactions as cholesterol, but it required about 10 minutes at 60° C. for liberation of iodine to be completed in view of the slower rate at which the deiodination reaction occurs with cholesterol esters as compared to cholestrol. The spot obtained from the oleic acid solution remained colorless after prolonged heating at 60° C., indicating that fatty acids do not undergo the reaction sequence.

EXAMPLE 2

The procedure employed in Example 1 was repeated with the same five cholesterol solutions except that the solutions were spotted on Eastman Chromagram Sheet Type 6064 (trademark for a precoated sheet material used in thin-layer chromatography which employ no binder and in which the sorbent is cellulose). After fuming with bromine vapor, the spots were treated with an acetone solution of sodium iodide and 4,4'-bis(dimethylamino)thiobenzophenone. Liberation of the iodine resulted in the formation of a blue color at the spot where the cholesterol solution had been applied. In carrying out this same procedure with solutions of cholesteryl myristrate and oleic acid, it was found that a blue color formed with the cholesteryl myristate spot but that the oleic acid spot remained colorless.

EXAMPLE 3

A chromatographic separation of a lipid extract of human serum was carried out using Eastman Chromagram Sheet Type 6061 and a mixture of 80 parts by volume n-hexane, 20 parts by volume ethyl ether, and one part by volume acetic acid as the developing solvent. Zones known as chromatographic bands are formed by such separation and separate bands are formed for cholesterol, esters of cholesterol, fatty acids and triglycerides. Fuming of the sheet with bromine vapor followed by treatment with a solution of sodium iodide in acetone resulted in the formation of the brown color caused by reaction of iodine with polyvinyl alcohol at the cholesterol band and the cholesterol ester band, but no other bands gave a detectable color indicating that there were no other compounds in the extract that underwent the reaction sequence to liberate iodine.

EXAMPLE 4

A section of Eastman Chromagram Sheet Type 6064 was impregnated with silver bromide by dipping it into a dilute silver nitrate solution and then into a dilute potassimum bromide solution, washing with water to remove excess soluble salts, and drying. A chloroform solution of cholesterol was spotted on the sheet and it was then irradiated with ultraviolet light for several minutes to effect the release of bromine and resulting bromination of the cholesterol. Treatment with an acetone solution of sodium iodide and 4,4'-bis(dimethylamino)thiobenzophenone resulted in the formation of a blue spot on a dark orange background.

EXAMPLE 5

A sample of human serum was analyzed by the procedure of Pierson, Stern and McGavick, Anal. Chem., 53, 813 (1953) and found to contain 280 milligrams total cholesterol per deciliter. Analysis of a 100 microliter sample of this serum was then carried out by the method of this invention using as a control a suspension of 280 micrograms of cholesterol in 100 microliters of water. In carrying out the analysis, the serum sample and the control suspension were added to separate test tubes and one milliliter of acetic acid was added to each tube to prevent precipitation. Bromine water was added to each tube until color persisted and then a crystal of sulfosalicylic acid was added to consume the excess bromine. To effect the iodination, one milliliter of a 10 percent by weight solution of potassium iodide in a mixture of water and acetone was added to each of the test tubes. The resulting yellow color due to liberation of iodine was of equal visual intensity in each tube.

The invention has been described in detail with particular reference to certain preferred embodiments thereof, but it will be understood that variations and modifications can be effected within the spirit and scope of the invention.

I claim:
1. A method for the quantitative determination of total cholesterol in a body fluid, which comprises:
   (1) contacting a sample of said body fluid with bromine in an amount in excess of that which reacts therewith to thereby convert the cholesterol and cholesterol esters in said sample to their 5,6-dibromo derivatives,
   (2) removing any excess bromine which is present in said brominated sample,
   (3) contacting said brominated sample with a solution of an iodide salt to convert said 5,6-dibromo derivatives to the corresponding 5,6-diiodo derivatives which decompose quantitatively to liberate iodine and regenerate the cholesterol and cholesterol esters, and
   (4) measuring the amount of iodine liberated.
2. The method of claim 1 wherein said body fluid is serum.
3. The method of claim 1 wherein said body fluid is applied to a coated test medium and then contacted with bromine vapor.
4. The method of claim 3 wherein said coated test medium is a thin-layer chromatographic element.
5. The method of claim 1 wherein said body fluid is applied to a coated test medium containing a bromine compound which decomposes upon irradiation to release bromine.
6. The method of claim 1 wherein said body fluid is reacted with bromine in solution.
7. The method of claim 1 wherein said iodide salt is an alkali metal iodide.
8. The method of claim 1 wherein said iodide salt is sodium iodide.
9. The method of claim 1 wherein said iodide salt is potassium iodide.
10. The method of claim 1 wherein said solution of iodide salt is an acetone solution of an alkali metal iodide.
11. The method of claim 1 wherein said solution of iodide salt contains a reagent that undergoes a color-forming reaction with iodine.
12. The method of claim 1 wherein the liberation of iodine is accelerated by the application of heat.
13. The method of claim 1 wherein the amount of iodine liberated is determined by reacting it with polyvinyl alcohol and measuring the intensity of the color formed.
14. The method of claim 1 wherein the amount of iodine liberated is determined by reacting it with 4,4'-bis-(dimethylamino)thiobenzophenone and measuring the intensity of the color formed.

References Cited
UNITED STATES PATENTS

| | | | |
|---|---|---|---|
| 3,260,648 | 7/1966 | Fox | 23—230 B |
| 3,715,188 | 2/1973 | Denney | 23—230 B |
| 3,736,263 | 5/1973 | Parekh et al. | 23—230 B |

MORRIS O. WOLK, Primary Examiner

R. E. SERWIN, Assistant Examiner

U.S. Cl. X.R.

23—253 TP, 230 PC